United States Patent
Yuan et al.

(10) Patent No.: US 10,534,561 B1
(45) Date of Patent: Jan. 14, 2020

(54) STORAGE APPARATUS SYSTEM AND STORAGE CONTROL METHOD THAT OUTPUTS A BUSY STATE OR READY STATE THROUGH A READY/BUSY PIN

(71) Applicant: ADATA TECHNOLOGY CO., LTD., New Taipei (TW)

(72) Inventors: Kuo-Hua Yuan, Hsinchu (TW); Kuo-Chung Liao, New Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/172,944

(22) Filed: Oct. 29, 2018

(30) Foreign Application Priority Data

Aug. 31, 2018  (TW) .............................. 107130612 A (51) Int. Cl.
*G06F 3/00* (2006.01)
*G06F 3/06* (2006.01)
*G06F 13/42* (2006.01)

(52) U.S. Cl.
CPC .......... *G06F 3/0658* (2013.01); *G06F 3/0607* (2013.01); *G06F 3/0683* (2013.01); *G06F 13/4282* (2013.01); *G06F 2213/0016* (2013.01)

(58) Field of Classification Search
CPC ..................................................... G06F 3/0658
See application file for complete search history.

(56) References Cited

U.S. PATENT DOCUMENTS

| 10,007,632 B2 * | 6/2018 | Bailey | G06F 13/385 |
| 2017/0371577 A1 * | 12/2017 | Liu | G06F 3/0656 |
| 2019/0026240 A1 * | 1/2019 | Sachidanandam | G06F 13/36 |

* cited by examiner

*Primary Examiner* — Tammara R Peyton
(74) *Attorney, Agent, or Firm* — Li & Cai Intellectual Property (USA) Office (57) ABSTRACT

A storage apparatus and a storing method are provided. The storage apparatus includes one or more storage devices, an interface expander and a master controller. The storage device includes a storage module, a storage control circuit and a ready/busy pin. The storage control circuit outputs an operational state signal according to an operational state of the storage module through the ready/busy pin. The master controller outputs an interface signal to indicate the interface expander to provide the operational state signal. The interface expander detects the ready/busy pin of the storage device to receive and transmit the operational state signal from the storage device to the master controller according to the interface signal. The master controller determines whether the storage device is in a busy state or a ready state according to the operational state signal, and accordingly outputs a control signal to control operations of the storage devices.

9 Claims, 7 Drawing Sheets

STORAGE APPARATUS SYSTEM AND STORAGE CONTROL METHOD THAT OUTPUTS A BUSY STATE OR READY STATE THROUGH A READY/BUSY PIN

CROSS-REFERENCE TO RELATED PATENT APPLICATION

This application claims the benefit of priority to Taiwan Patent Application No. 107130612, filed on Aug. 31, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a storage apparatus and a storing method, and more particularly to a storage apparatus and a storing method for outputting a busy state or a ready state through a ready/busy pin.

BACKGROUND OF THE DISCLOSURE

Hosts of personal computers and other electronic devices typically use large-capacity storages such as hard disk drives (HDD) to store large amounts of data. Since solid state drives (SSD) do not have any mechanical parts therein, they can operate normally even when being moved at high speeds and being flipped and tilted during high speed movement. Furthermore, a possibility of data loss from the solid state drives can be minimized in collisions and shocks. Therefore, the solid state drives have replaced the conventional hard disks and optical disks and become a preferred large-capacity storage apparatus.

SUMMARY OF THE DISCLOSURE

In response to the above-referenced technical inadequacies, the present disclosure provides a storage apparatus, which includes one or more storage devices, an interface expander and a main controller. Each of the storage devices includes a storage module, a storage control circuit and one or more ready/busy pins. The storage control circuit is connected to the storage module and the ready/busy pins. The storage control circuit generates an operational state signal according to an operational state of the storage module, and outputs the operational state signal through the ready/busy pin. The interface expander is connected to the one or more ready/busy pins of the one or more storage devices. The interface expander detects the one or more ready/busy pins of the one or more storage devices to receive the one or more operational state signals from the one or more storage devices. The interface expander outputs the one or more operational state signals of the one or more storage devices indicated by an interface signal. The main controller is connected to the interface expander and the one or more storage devices. The main controller outputs the interface signal to the interface expander to instruct the interface expander to provide the one or more operational state signals of the one or more storage devices. The main controller determines whether the storage devices are in busy states or ready states according to the operational state signals, and accordingly to output a control signal to control an operation of each of the storage devices.

In addition, the present disclosure provides a storing method, including the following steps: generating an operational state signal according to an operational state of a storage module of each of one or more storage devices by a storage control circuit of each of the storage devices; outputting the operational state signal through a ready/busy pin of each of the storage devices; outputting an interface signal to an interface expander from the main controller to instruct the interface expander to provide the operational state signals of the storage devices; detecting the ready/busy pins of the storage devices to transmit the operational state signals from the storage devices according to an interface signal by an interface expander; and determining whether each of the storage devices is in a busy state or a ready state to output a control signal for controlling an operation of each of the storage devices according to the corresponding operational state signal by the main controller.

As described in above, in comparison with the conventional storage apparatus using a bus bar to output an instruction for reading to determine whether the operational state of the storage device is the ready state, the storage apparatus and the storing method of the present disclosure use the main controller to determine the operational states of the storage devices such as the busy states and the ready states according to the operational state signals outputted through the ready/busy pins. Furthermore, during the transmission of the operational state signals, the GPIO interface of the interface expander receives the operational state signals from the ready/busy pins of the storage devices, and then the I2C/SPI interface of the interface expander transmits the operational state signals to the main controller. Therefore, the present disclosure has advantages of high accuracy and high stability without occupying bandwidths of the bus bars and increasing the number of pins of the main controller.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
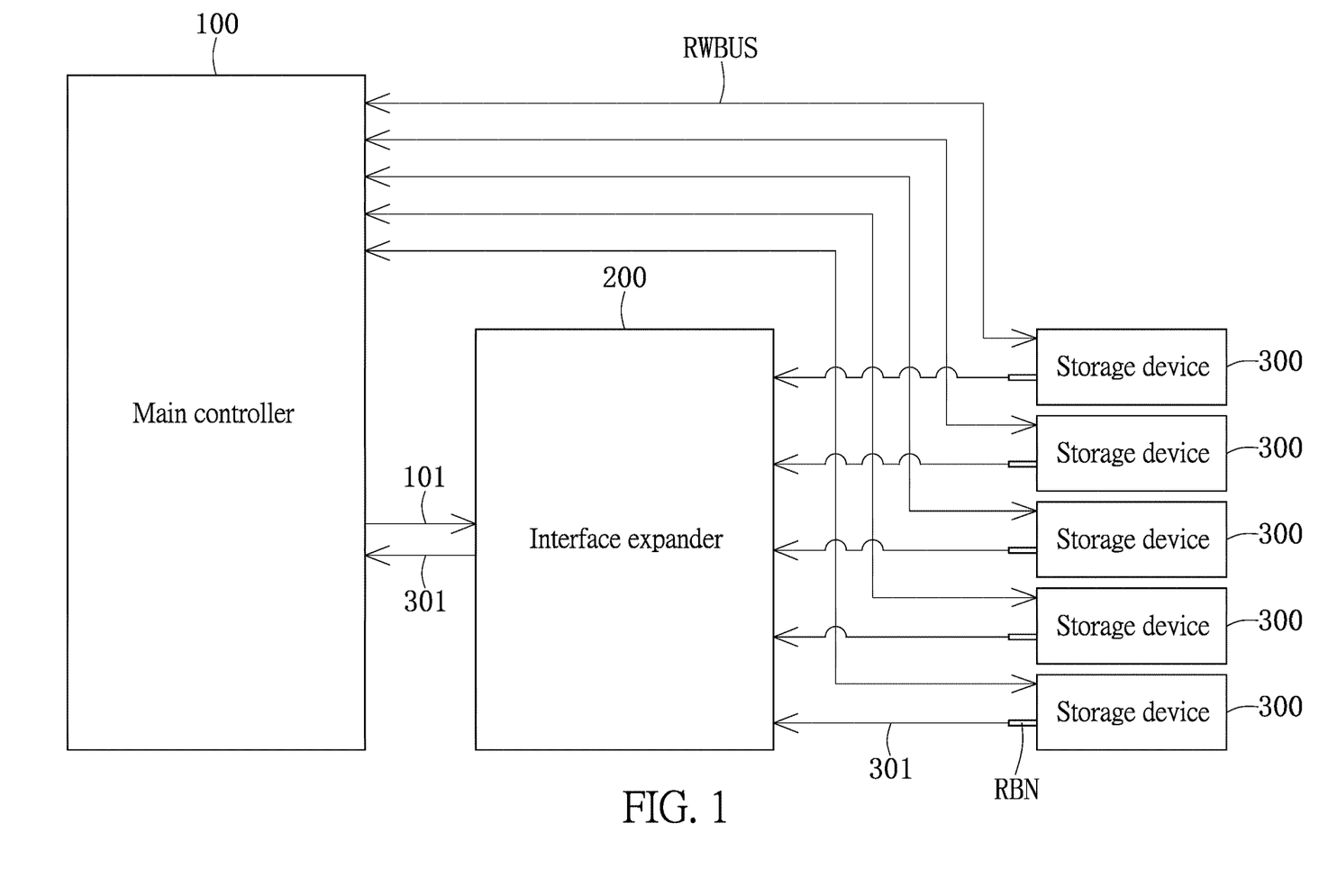
FIG. 1 is a block diagram of a storage apparatus according to a first embodiment of the present disclosure.

Reference is made to FIG. 1, which is a block diagram of a storage apparatus according to a first embodiment of the present disclosure. As shown in FIG. 1, the storage apparatus includes a main controller 100, an interface expander 200 and a plurality of storage devices 300. The interface expander 200 is connected to the main controller 100 and the storage devices 300. The storage devices 300 are connected to the main controller 100.

The storage device 300 may be, for example, a volatile memory or a non-volatile memory. Each of the storage devices 300 may have one or more ready/busy pins RBN. The storage devices 300 are connected to the interface expander 200 through the ready/busy pins RBN. In the embodiment, the six storage devices 300 are taken as an example. However, in practice, the number of the storage devices 300 may be reduced or expanded according to actual requirements. In addition, the main controller 100 may be connected to control pins and data input/output pins of the storage devices 300 through bus bars RWBUS such as control bus bars, data bus bars or other suitable bus bars.

The main controller 100 may be, for example, a controller for a solid state drive, but the present disclosure is not limited thereto. The main controller 100 may output an interface signal 101 to the interface expander 200 to instruct the interface expander 200 to provide operational states of the storage devices 300. It should be noted that, when the interface expander 200 receives the interface signal 101 from the main controller 100, the interface expander 200 may simultaneously or sequentially detect the ready/busy pins RBN of the storage devices 300 according to the interface signal 101. When the interface expander 200 detects operational state signals 301 corresponding to the operational states of the storage devices 300 through the ready/busy pins RBN of the storage devices 300, the interface expander 200 may simultaneously or sequentially receive the operational state signals 301 of the storage devices 300.

In practice, the interface expander 200 may continuously detect the ready/busy pins RBN of the storage devices 300 before receiving the interface signal 101 from the main controller 100. When the interface expander 200 receives the interface signal 101 from the main controller 100, the interface expander 200 provides the operational state signals 301 of the storage devices 300 specified by the interface signal 101 or all the storage devices 300 to the main controller 100.

On the other hand, each time the operating state of the storage device 300 is changed, the storage device 300 outputs the operational state signal 301 corresponding to the changed operational state to the interface expander 200. The interface expander 200 may transmit the received operational state signal 301 immediately or after a period of time to the main controller 100. In this condition, the main controller 100 may omit the step of outputting the interface signal 101.

In addition, the operational state signal 301 may further include a serial number of the storage device 300, a time point of obtaining the operating state of a storage module, a level of busyness or idleness of the storage module, the ready/busy pin RBN through which the operational state signal 301 is outputted, or a combination thereof.

Finally, the main controller 100 determines whether the storage device 300 is in a busy state or a ready state according to the operational state signal 301 of the storage device 300 provided by the interface expander 200, and accordingly outputs a control signal to the storage device 300 to control the operation of the storage device 300.

More specifically, when the storage device 300 is erasing the stored original data, reading the new data, or writing the new data, the storage device 300 outputs the operational state signal 301 indicating that the storage device 300 is in the busy state. Conversely, when the storage device 300 does not perform any operation and is in an idle state, the storage device 300 outputs the operational state signal 301 indicating that the storage device 300 is in the ready state.

Second Embodiment

Figure 2:
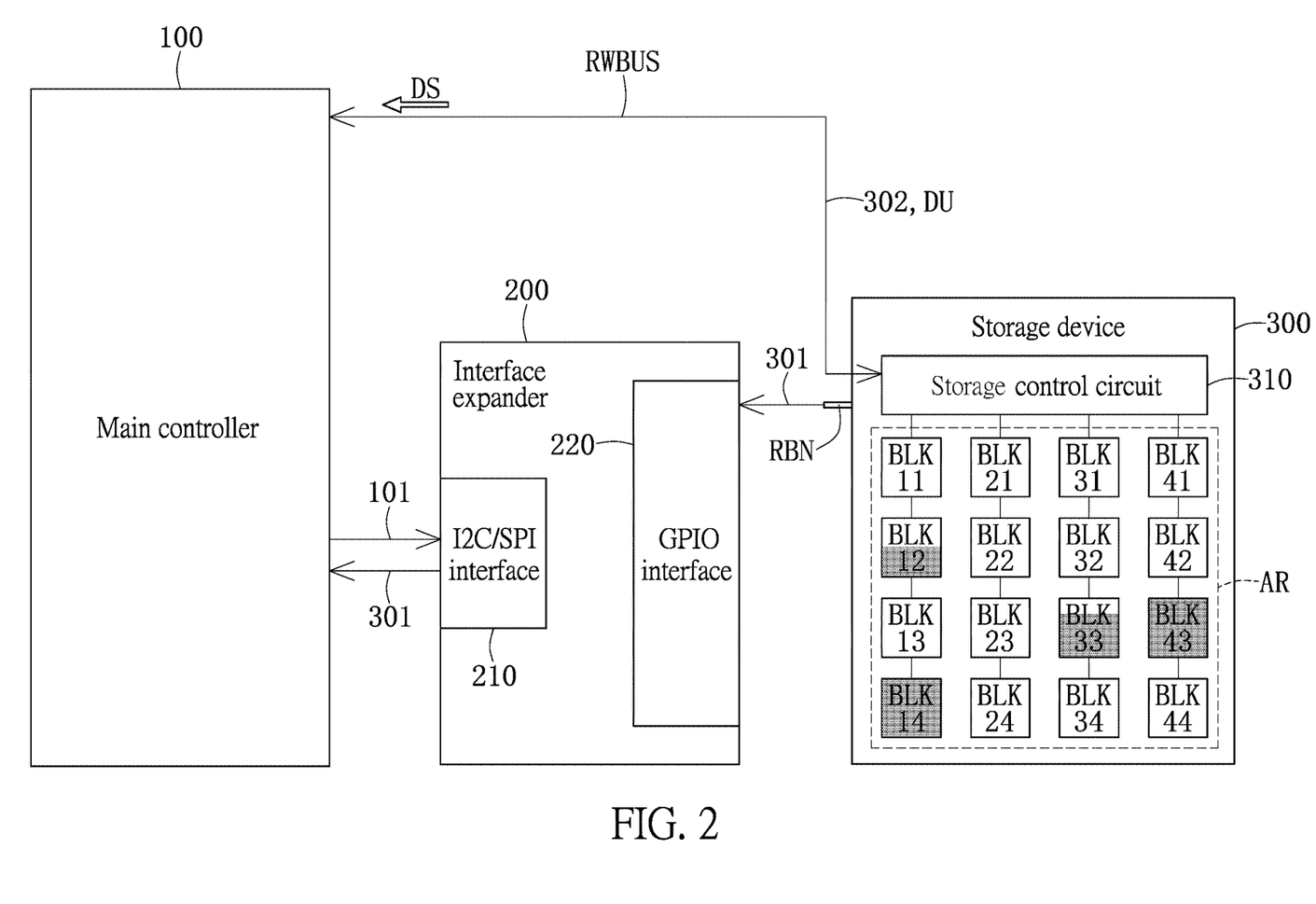
FIG. 2 is a block diagram of a storage apparatus according to a second embodiment of the present disclosure.

Reference is made to FIG. 2, which is a block diagram of a storage apparatus according to a second embodiment of the present disclosure. As shown in FIG. 2, the storage apparatus includes the main controller 100, the interface expander 200 and the storage device 300. The interface expander 200 is connected to the main controller 100 and the ready/busy pin RBN of the storage device 300. In addition, the main controller 100 may be connected to the control pin and the data input/output pin of the storage device 300 through the bus bar RWBUS such as the control bus bar, the data bus bar or other suitable bus bars.

For example, the storage device 300 may include a storage module AR, a storage control circuit 310, and one or more ready/busy pins RBN. The storage control circuit 310 is connected to the storage module AR and the ready/busy pin RBN.

The storage device 300 may be a NAND or NOR flash memory device. In the embodiment, the storage module AR may be an array, in which a plurality of memory cells BLK11 to BLK14, BLK21 to BLK24, BLK31 to BLK34 and BLK41 to BLK44 are arranged. It should be understood that the number, arrangement, and storage capacity of the storage device 300 may be adjusted according to actual requirements, and the present disclosure is not limited thereto.

In practice, the storage control circuit 310 may generate one operational state signal 301 according to the operational states of the memory cells of the storage module AR, or may generate a plurality of operational state signals 301 according to the operational states of the memory cells of the storage module AR respectively. The storage control circuit 310 may output the one operational state signal 301 through the ready/busy pin RBN. Alternatively, the operational state signals 301 of the storage module AR of the storage device 300 may be sequentially transmitted through the same ready/busy pin RBN, or in practice, the operational state signals 301 may be transmitted through the different ready/busy pins RBN respectively.

The manner of signal transmission between the storage device 300 and the interface expander 200, and between the main controller 100 and the interface expander 200 may depend on the type of the transmission interface employed, for example, a serial transmission or a parallel transmission. The interface expander 200 may include one or more transmission interfaces. In the embodiment, the interface expander 200 may include two different transmission interfaces, which are connected to the storage device 300 and the main controller 100 respectively.

For example, in the embodiment, the interface expander 200 may include a GPIO interface 220, and an I2C interface and/or an SPI interface 210. The interface expander 200 is connected to the main controller 100 through the I2C/SPI interface 210. On the other hand, the interface expander 200 is connected to the ready/busy pin RBN of the storage device 300 through the GPIO interface 220. The GPIO interface 220 is configured to receive the operational state signal 301 from the ready/busy pin RBN of the storage device 300. The I2C/SPI interface 210 is configured to receive the interface signal 101 from the main controller 100 and transmit the operational state signal 301 received by the GPIO interface 220 to the main controller 100. It should be understood that in practice, the I2C/SPI interface 210 and the GPIO interface 220 may be replaced with other suitable transmission interfaces, and the present disclosure is not limited thereto.

When the main controller 100 determines that the storage device 300 is in the ready state according to the operational state signal 301, the main controller 100 may control the storage device 300 to operate, which is described as follows.

The storage device 300 may receive a control signal 302 from the main controller 100 through the control pin. The storage control circuit 310 may erase original data DS stored in the storage module AR according to the control signal 302 from the main controller 100. The storage device 300 may then receive new data DU provided by the main controller 100 through the data input/output pin. The storage control circuit 310 may then control the storage module AR to access the new data DU. It should be understood that, for example, if the original data DS is not stored in the storage module AR storing the new data DU, the operation of erasing the original data DS may be omitted. Alternatively, the original data DS may be directly replaced with the new data DU, or the new data DU and the original data DS are stored in the same or different storage modules AR. It should be understood that, in practice, the storage device 300 may receive the control signal 302 from the main controller 100 and supply the original data DS to the main controller 100 through the same pin.

More precisely, the main controller 100 may check remaining storage capacities of the memory cells BLK11 to BLK14, BLK21 to BLK24, BLK31 to BLK34 and BLK41 to BLK44 of the storage modules AR of the storage devices 300. For example, the memory cells BLK14 and BLK43 have no usable storage capacity, and the memory cells BLK12 and BLK33 have a portion of the storage capacities used. The main controller 100 may compare the remaining storage capacities of the memory cells BLK11 to BLK14, BLK21 to BLK24, BLK31 to BLK34 and BLK41 to BLK44 with the storage capacity required by (i.e. a storage space occupied by) the new data DU to be stored to appropriately select one of the memory cells BLK11 to BLK14, BLK21 to BLK24, BLK31 to BLK34 and BLK41 to BLK44 of the storage modules AR to store the new data DU.

When the main controller 100 intends to obtain the original data DS and/or the new data DU stored in the storage module AR of the storage device 300, the main controller 100 may output the control signal 302 to the storage control circuit 310 through the control pin of the storage control circuit 310 to instruct the storage control circuit 310 of the storage device 300 to output the one or more original data DS and/or new data DU stored in the one or more memory cells of the storage module AR to the main controller 100.

Further, when the storage device 300 erases the original data DS, accesses the new data DU or outputs the original data DS to the main controller 100, the storage control circuit 310 outputs the operational state signal 301 indicating that the storage device 300 is in the busy state to the GPIO interface of the interface expander 200, and then the operational state signal 301 is transmitted to the main controller 100 through the I2C/SPI interface 210 of the interface expander 200.

For example, when the storage control circuit 310 and/or the storage module AR is in the busy state, the storage control circuit 310 outputs the operational state signal 301 at a low level. Conversely, when neither the storage control circuit 310 nor the storage module AR performs any operation or any important work (i.e. being in an idle state), the storage control circuit 310 outputs the operational state signal 301 at a high level.

Third Embodiment

Figure 3:
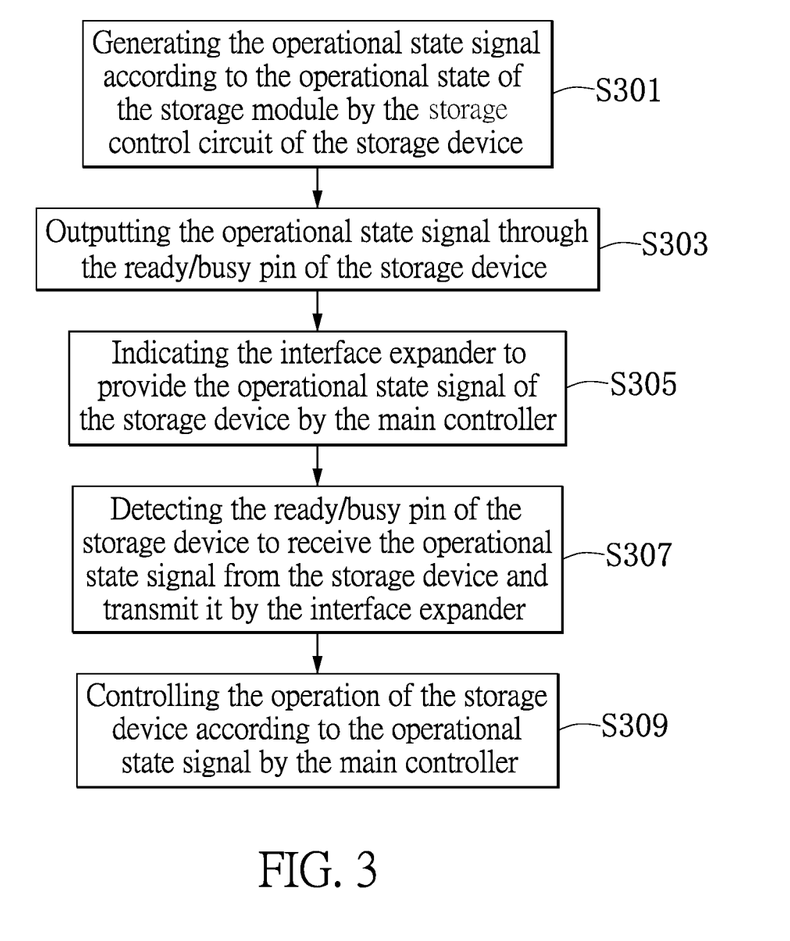
FIG. 3 is a flowchart of a storing method according to a third embodiment of the present disclosure.

Reference is made to FIG. 3, which is a flowchart of a storing method according to a third embodiment of the present disclosure. As shown in FIG. 3, in the embodiment, the storing method includes the following steps S301 to S309, which may be appropriately combined with other steps in the present disclosure, for the storage apparatuses of the first and second embodiments.

In step S301, the storage control circuit of each of the one or more storage devices generates the operational state signal according to the operational state of the storing module.

In step S303, the storage devices output the operational state signals through the ready/busy pins respectively.

In step S305, the main controller outputs the interface signal to the interface expander to instruct the interface expander to provide the operational state signals from the storage devices.

In step S307, the interface expander detects the ready/busy pins of the one or more storage devices to receive the operational state signals from the storage devices, and transmit the operational state signals to the main controller, according to the interface signal from the main controller.

In step S309, the main controller determines the operational states of the storage devices such as the busy states or the ready states according to the operational state signals from the storage devices, and accordingly outputs the control signals for controlling the operations of the storage devices.

Fourth Embodiment

Figure 4:
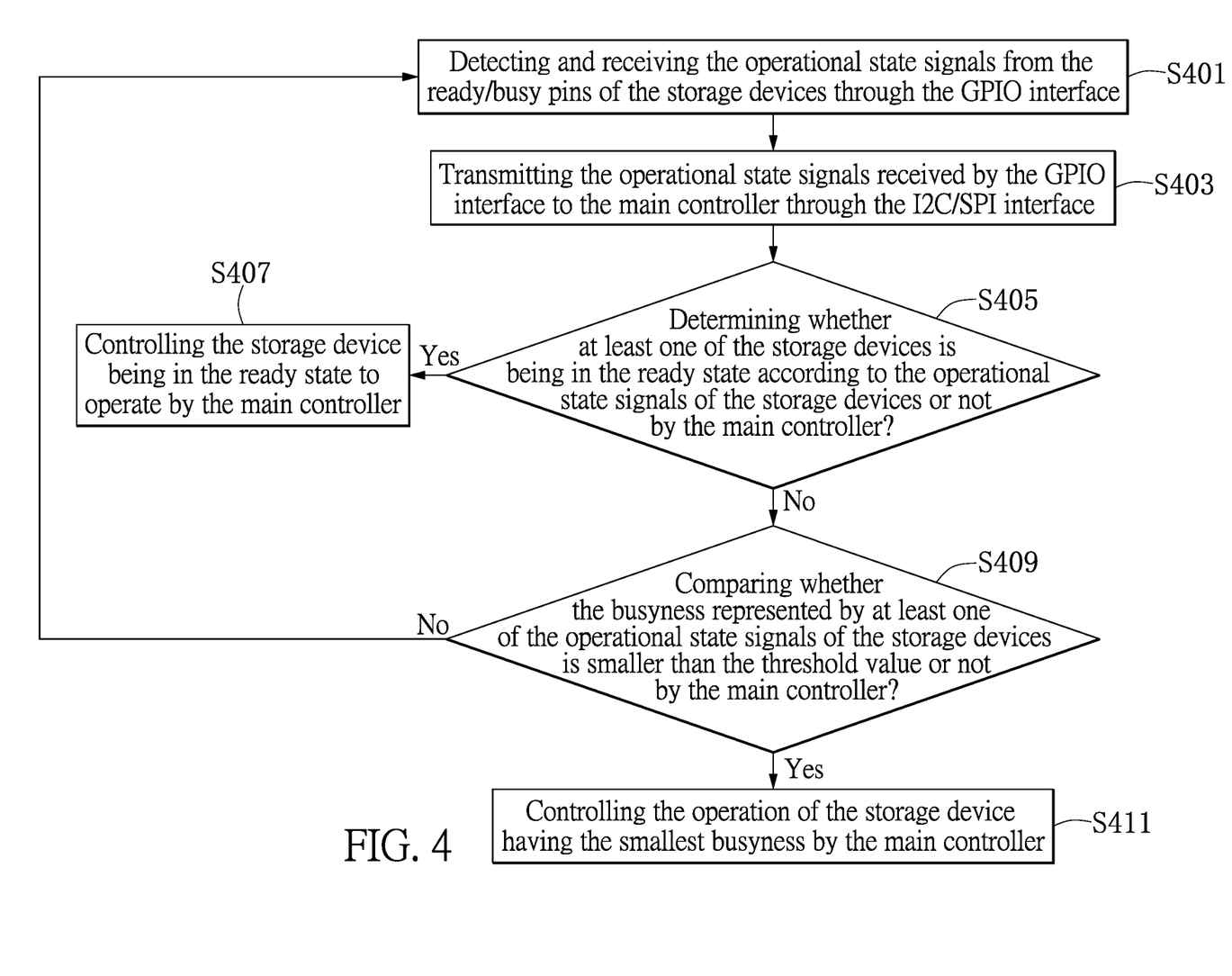
FIG. 4 is a flowchart of a storing method according to a fourth embodiment of the present disclosure.

Reference is made to FIG. 4, which is a flowchart of a storing method according to a fourth embodiment of the present disclosure. As shown in FIG. 4, in the embodiment, the storing method includes the following steps S401 to S411, which may be appropriately combined with other steps in the present disclosure, for the storage apparatuses of the first and second embodiments.

In step S401, the GPIO interface of the interface expander detects the ready/busy pins of the storage devices, and receives the operational state signals through the ready/busy pins from the storage control circuits of the storage devices.

In step S403, the I2C/SPI interface of the interface expander transmits the operational state signals received by the GPIO interface of the interface expander to the main controller.

In step S405, the main controller determines whether any one of the storage devices is in the ready state according to the operational state signals from the storage devices. If at least one of the storage devices is in the ready state, step S407 is performed. If all of the storage devices are not in the ready state, steps S409 and S411 are performed sequentially.

In step S407, the main controller outputs the control signals to control the one or more storage devices in the ready state to operate, for example, to read, write, erase the data or perform other operations.

In step S409, the main controller compares the busyness level represented by each of the operational state signals of the storage devices with a threshold value. If the busyness level is not smaller than the threshold value, step S401 is performed again. If the busyness level is smaller than the threshold value, step S411 is performed.

In step S411, the main controller controls any one of the one or more storage devices having the busyness level smaller than the threshold value or the storage device having the smallest busyness level.

Fifth Embodiment

Figure 5:
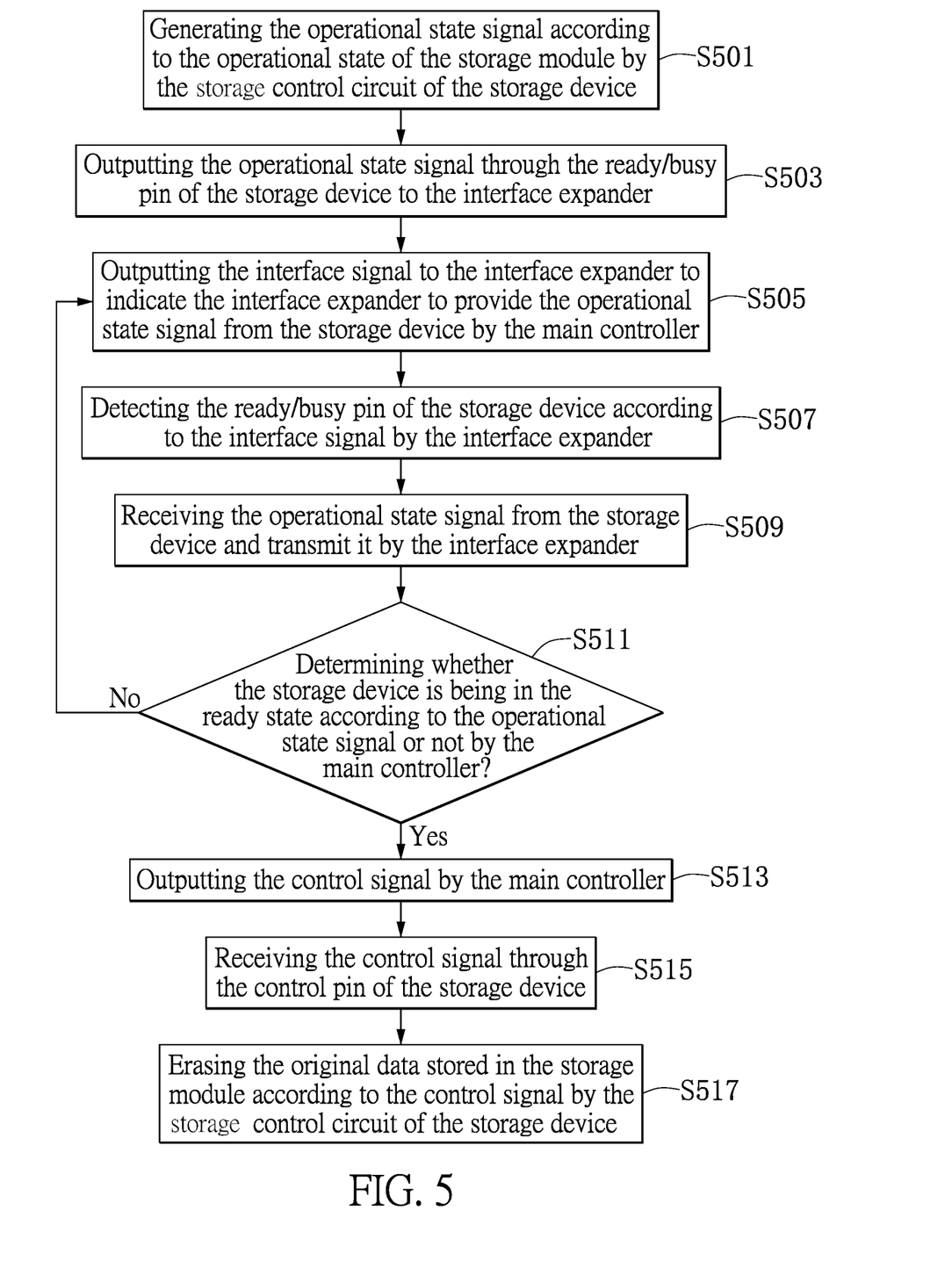
FIG. 5 is a flowchart of a storing method according to a fifth embodiment of the present disclosure.

Reference is made to FIG. 5, which is a flowchart of a storing method according to a fifth embodiment of the present disclosure. As shown in FIG. 5, in the embodiment, the storing method includes the following steps S501 to S517, which may be appropriately combined with other steps in the present disclosure, for the storage apparatuses of the first and second embodiments.

In step S501, the storage control circuit of each of the one or more storage devices generates the operational state signal according to the operational state of the storage module.

In step S503, the storage devices output the operational state signals through the ready/busy pins thereof.

In step S505, the main controller outputs the interface signal to the interface expander to instruct the interface expander to provide the operational state signals from the storage devices.

In step S507, the interface expander detects the ready/busy pins of the storage devices according to the interface signal.

In step S509, the interface expander receives the operational state signals from the storage devices and transmits them.

In step S511, the main controller determines whether at least one of the storage devices is in the ready state according to the operational state signals. If none of the storage devices is in the ready state, steps S501 to S511 are performed again for detecting whether at least one of the storage devices is changed to the ready state from the busy state after a period of time. If at least one of the storage devices is in the ready state, steps S513 to S517 are performed sequentially.

In step S513, the main controller outputs the control signal.

In step S515, the storage device receives the control signal through the control pin.

In step S517, the storage control circuit of the storage device erases the original data stored in the storage module according to the control signal.

Sixth Embodiment

Figure 6:
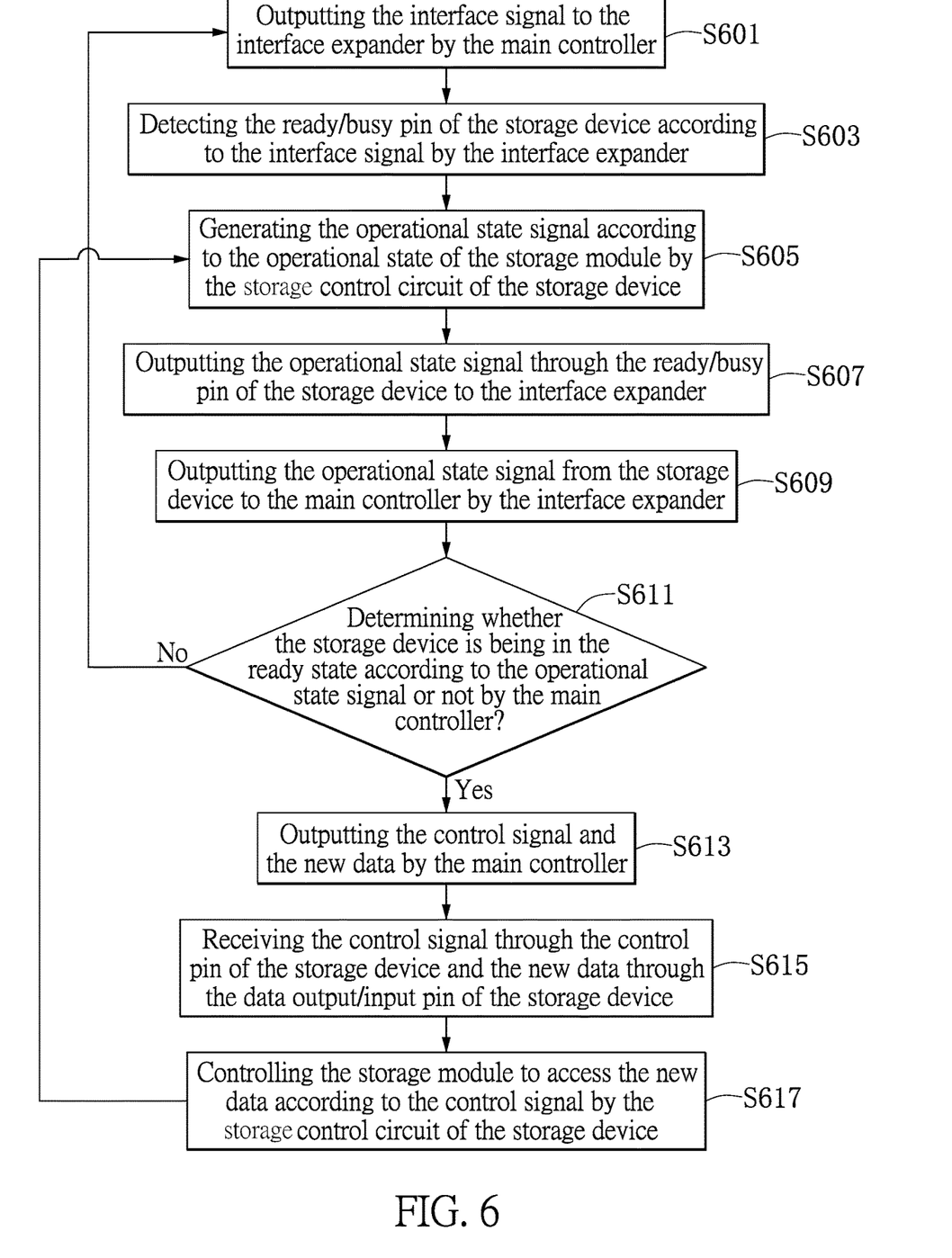
FIG. 6 is a flowchart of a storing method according to a sixth embodiment of the present disclosure.

Reference is made to FIG. 6, which is a flowchart of a storing method according to a sixth embodiment of the present disclosure. As shown in FIG. 6, in the embodiment, the storing method includes the following steps S601 to S617, which may be appropriately combined with other steps in the present disclosure, for the storage apparatuses of the first and second embodiments.

In step S601, the main controller outputs the interface signal to the interface expander.

In step S603, the interface expander detects the ready/busy pin of the storage device according to the interface signal.

In step S605, the storage control circuit of the storage device generates the operational state signal according to the operational state of the storage module.

In step S607, the storage device outputs the operational state signal to the interface expander through the ready/busy pin.

In step S609, the interface expander outputs the operational state signal from the storage device to the main controller.

In step S611, the main controller determines whether the storage device is in the ready state according to the operational state signal. If the storage device is not in the ready state, step S601 is performed again. If the storage device is being in the ready state, steps S613 to S617 are performed sequentially.

In step S613, the main controller outputs the control signal and the new data.

In step S615, the storage device receives the control signal through the control pin and the new data through the data output/input pin.

In step S617, the storage control circuit of the storage device controls the storage module to access the new data according to the control signal.

Seventh Embodiment

Figure 7:
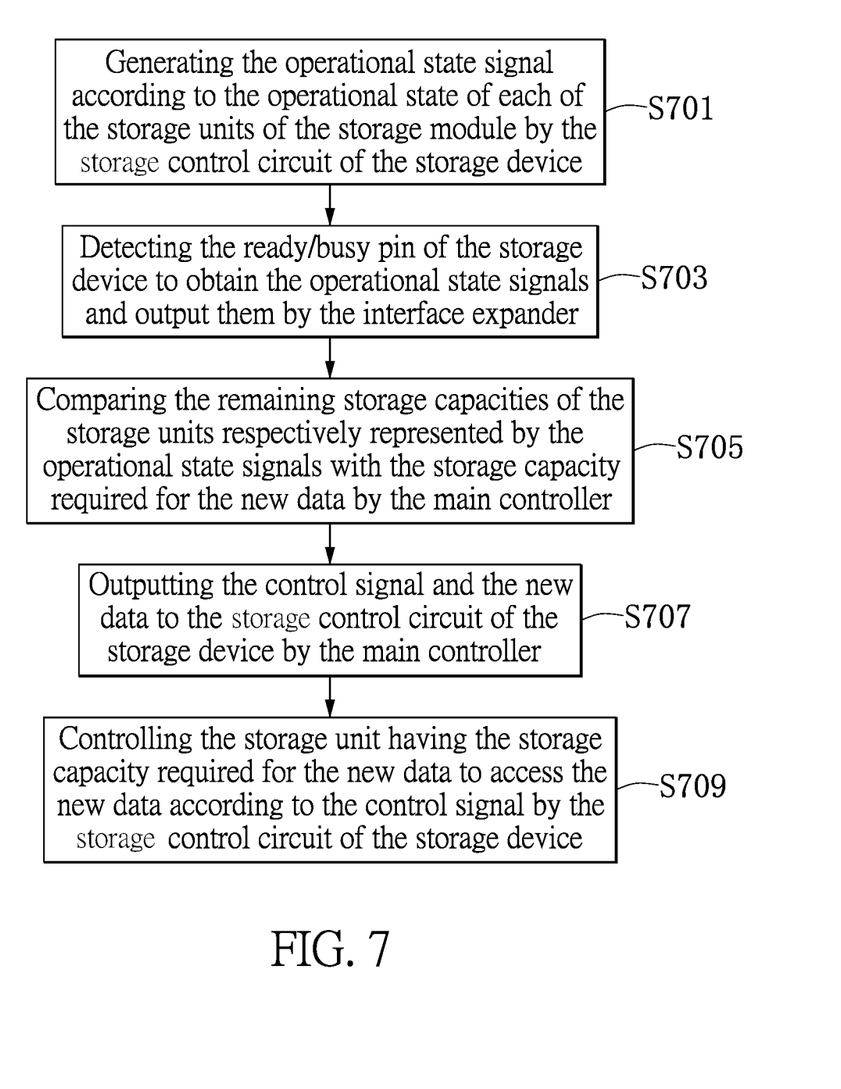
FIG. 7 is a flowchart of a storing method according to a seventh embodiment of the present disclosure.

Reference is made to FIG. 7, which is a flowchart of a storing method according to a seventh embodiment of the present disclosure. As shown in FIG. 7, in the embodiment, the storing method includes the following steps S701 to S709, which may be appropriately combined with other steps in the present disclosure, for the storage apparatuses of the first and second embodiments.

In step S701, the storage control circuits of the one or more storage devices respectively generates the operational state signals according to the operational states of the storage cells of the storage module.

In step S703, the interface expander detects the ready/busy pins of the storage devices to obtain the operational state signals from the storage devices, and then outputs the operational state signals to the main controller.

In step S705, the main controller checks the remaining storage capacities of the storage cells of the same storage device or the different storage devices that are respectively represented by the operational state signals with the storage capacity required for the new data.

In step S707, the main controller outputs the control signal and the new data to the storage control circuit of the storage device.

In step S709, the storage control circuit of the storage device controls the storage cell having the storage capacity required for the new data to access the new data.

In comparison with the conventional storage apparatus using the bus bar to output an instruction for reading whether the operational state of the storage device is the ready state, the storage apparatus and the storing method of the present disclosure use the main controller to determine the operational states of the storage devices such as the busy states and the ready states according to the operational state signals outputted through the ready/busy pins. Furthermore, during the transmission of the operational state signals, the GPIO interface of the interface expander receives the operational state signals from the ready/busy pins of the storage devices, and then the I2C/SPI interface of the interface expander transmits the operational state signals to the main controller. Therefore, the present disclosure has advantages of high accuracy and high stability without occupying bandwidths of the bus bars and increasing the number of pins of the main controller.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A storage apparatus, comprising:
   one or more storage devices each including a storage module, a storage control circuit and one or more ready/busy pins, wherein the storage control circuit is connected to the storage module and the ready/busy pins, the storage control circuit generates an operational state signal according to an operational state of the storage module, and outputs the operational state signal through the ready/busy pin;
   an interface expander connected to the one or more ready/busy pins of the one or more storage devices, wherein the interface expander detects the one or more ready/busy pins of the one or more storage devices to receive the one or more operational state signals from the one or more storage devices, and the interface expander outputs the one or more operational state signals of the one or more storage devices indicated by an interface signal; and
   a main controller connected to the interface expander and the one or more storage devices, wherein the main controller outputs the interface signal to the interface expander to instruct the interface expander to provide the one or more operational state signals of the one or more storage devices, the main controller determines whether the storage devices are in busy states or ready states according to the operational state signals, and accordingly to output a control signal to control an operation of each of the storage devices.

2. The storage apparatus of claim 1, wherein the interface expander includes an I2C interface or an SPI interface, and a GPIO interface, the interface expander is connected to the main controller through the I2C interface and/or the SPI interface, and connected to the ready/busy pins of the storage devices through the GPIO interface;
   wherein the GPIO interface is configured to receive the operational state signals from the ready/busy pins, and the I2C interface or the SPI interface is configured to receive the interface signal from the main controller and transmit the operational state signals received by the GPIO interface to the main controller.

3. The storage apparatus of claim 1, wherein the storage device further includes a data output/input pin and a control pin, the storage device is connected to the main controller through the data output/input pin and the control pin, the main controller outputs new data through the data output/input pin and the control signal through the control pin to the storage control circuit to instruct the storage control circuit of the storage device being in the ready state to erase original data stored in the storage module and/or control the storage module to access the new data provided by the main controller;
   wherein when the storage device erases the original data or accesses the new data, the storage control circuit outputs the operational state signal indicating that the storage device is in the busy state.

4. The storage apparatus of claim 1, wherein the storage device further includes a control pin, the storage device is connected to the main controller through the control pin, the main controller outputs the control signal to the storage control circuit through the control pin to instruct the storage control circuit of the storage device being in the ready state to output original data stored in the storage module to the main controller;
   wherein when the storage device outputs the original data to the main controller, the storage control circuit outputs the operational state signal indicating that the storage device is in the busy state.

5. A storing method, comprising:
   generating an operational state signal according to an operational state of a storage module of each of one or more storage devices by a storage control circuit of each of the storage devices;
   outputting the operational state signal through a ready/busy pin of each of the storage devices;
   outputting an interface signal to an interface expander from the main controller to instruct the interface expander to provide the operational state signals of the storage devices;

detecting the ready/busy pins of the storage devices to transmit the operational state signals from the storage devices according to an interface signal by an interface expander; and determining whether each of the storage devices is in a busy state or a ready state to output a control signal for controlling an operation of each of the storage devices according to the corresponding operational state signal by the main controller.

6. The storing method of claim 5, further comprising:

receiving the operational state signals through a GPIO interface from the ready/busy pins; and transmitting the operational state signals received by the GPIO interface to the main controller through an I2C interface or an SPI interface.

7. The storing method of claim 5, further comprising:

outputting the control signal to the storage control circuit of the storage device through a control pin of the storage device from the main controller to instruct the storage control circuit of the storage device being in the ready state to erase original data stored in the storage module; and when the storage control circuit erases the original data, outputting the operational state signal indicating that the storage device is in the busy state from the storage control circuit of the storage device.

8. The storing method of claim 5, further comprising:

outputting new data to the storage control circuit of the storage device through a data output/input pin of the storage device from the main controller, and a control signal to the storage control circuit of the storage device through a control pin of the storage device from the main controller to instruct the storage control circuit to control the storage module to access the new data provided by the main controller; and when the storage module accesses the new data, outputting the operational state signal indicating that the storage device is in the busy state from the storage control circuit of the storage device.

9. The storing method of claim 5, further comprising:

outputting a control signal to the storage control circuit of the storage device through a control pin of the storage device from the main controller to instruct the storage control circuit to output original data stored in the storage module to the main controller; and when the storage module outputs the original data to the main controller, outputting the operational state signal indicating that the storage device is in the busy state from the storage control circuit of the storage device.

* * * * *